(12) United States Patent
Wechsler et al.

(10) Patent No.: US 12,091,217 B2
(45) Date of Patent: Sep. 17, 2024

(54) BEVERAGE CONTAINER

(71) Applicant: Helen of Troy Limited, St. Michael (BB)

(72) Inventors: Lev Wechsler, Bend, OR (US); Martin Mutch, Bend, OR (US)

(*) Notice: Subject to any disclaimer, the term of this patent is extended or adjusted under 35 U.S.C. 154(b) by 89 days.

(21) Appl. No.: 17/891,429

(22) Filed: Aug. 19, 2022

(65) Prior Publication Data

US 2024/0059459 A1  Feb. 22, 2024

(51) Int. Cl.
*B65D 39/00* (2006.01)
*B65D 39/08* (2006.01)

(52) U.S. Cl.
CPC .......... *B65D 39/0076* (2013.01); *B65D 39/08* (2013.01); *B65D 2205/00* (2013.01)

(58) Field of Classification Search
CPC .......... B65D 2543/00731; B65D 47/06; B65D 47/265; B65D 2543/00231; B65D 47/286; B65D 47/32; B65D 47/26; B65D 47/141; B65D 47/245; B65D 39/0076; B65D 39/08; B65D 2205/00
USPC ........................................................ 215/355
See application file for complete search history.

(56) References Cited

U.S. PATENT DOCUMENTS

| | | | |
|---|---|---|---|
| 3,809,275 A * | 5/1974 | Ek .......................... | B65D 39/08 215/314 |
| 3,874,541 A | 4/1975 | Lagneaux | |
| D429,118 S | 8/2000 | Hurlbut | |
| D639,166 S | 6/2011 | Carreno | |
| D652,682 S | 1/2012 | Eyal | |
| 9,045,036 B2 * | 6/2015 | Mihara ................ | B60K 15/035 |
| D737,149 S | 8/2015 | Son | |
| 9,215,942 B2 | 12/2015 | Bodum | |
| 9,745,110 B2 | 8/2017 | Boyer | |
| D823,689 S | 7/2018 | Durand | |
| 10,285,522 B2 | 5/2019 | Chin | |
| D871,844 S | 1/2020 | Adams, Jr. | |
| D878,156 S | 3/2020 | Rittri | |
| 10,870,522 B2 * | 12/2020 | Lane ..................... | B65D 47/286 |
| 2004/0201224 A1 | 10/2004 | Chang | |
| 2017/0318993 A1 * | 11/2017 | Young ................ | A47G 19/2272 |
| 2018/0305091 A1 * | 10/2018 | Krafft ................ | A47G 19/2272 |
| 2020/0361671 A1 * | 11/2020 | Schmidt .................... | A45F 3/18 |

FOREIGN PATENT DOCUMENTS

| | | |
|---|---|---|
| CN | 201694495 | 1/2011 |
| CN | 303965272 | 12/2016 |

* cited by examiner

*Primary Examiner* — Shawn M Braden
(74) *Attorney, Agent, or Firm* — RANKIN, HILL & CLARK LLP (57) ABSTRACT

A beverage container includes a vessel and a stopper. The vessel includes a body with a neck portion. The body has an outer wall and an inner wall, and the neck portion defines an open end of the vessel body. The stopper selectively seals the open end of the vessel body in a closed, sealed position and selectively unseals of the open end of the vessel body in an open position. The stopper includes a body having an outer sidewall and a bottom wall. A seal is releasably connected to the body. The seal has a seal sidewall and a rim extending inwardly from the seal sidewall. The seal sidewall sealingly engages the outer sidewall and the rim sealingly overlaps the bottom wall. The outer sidewall together with the seal define an air pathway for the flow of ambient air into an interior of the vessel.

18 Claims, 12 Drawing Sheets

BEVERAGE CONTAINER

BACKGROUND

Beverage containers, in particular so-called "travel mugs" or "tumblers" or "flasks", which have a closure in order to keep a liquid hot or cold are very popular. These beverage containers normally comprise a vessel having an upper open end or mouth, an internal thread placed in the region of the open end, as well as a lid, which can be screwed into the internal thread and thus allows a sealing connection between the vessel and the lid. These beverage containers can also be formed of a double-wall vacuumed formed construction to provide insulative properties to help maintain the temperature of the liquid within the container. Some beverage containers do not create a fully sealed vessel, and they will leak their contents when inverted or jostled, causing liquid contents to spill out and create a mess or damage other items. Also, depending upon the type of liquid stored in the vessel, in some situations, a vacuum can be formed within the interior of the vessel, and some beverage containers do not properly vent to equalize pressure within the vessel interior with ambient air.

SUMMARY

According to one aspect, a stopper for an associated beverage container comprises a body and a seal. The body has a top portion and an outer sidewall extended downward from the top portion relative to a longitudinal axis defined by the stopper. The outer sidewall has a first portion and a second portion axially spaced from the first portion, the first portion located between the top portion and the second portion. The first portion is adapted for connection to an inner part of the associated beverage container. The second portion includes a bottom wall of the body. The seal is releasably connected to the second portion. The seal has a seal sidewall and a rim extending inwardly from the seal sidewall. The seal sidewall sealingly engages the second portion and the rim sealingly overlaps the bottom wall. The second portion together with the seal define an air pathway extending in an axial direction of the body.

According to another aspect, a beverage container comprises a vessel and a stopper. The vessel includes a body with a neck portion. The body has an outer wall and an inner wall, and the neck portion defines an open end of the vessel body. The stopper selectively seals the open end of the vessel body in a closed, sealed position and selectively unseals of the open end of the vessel body in an open position. The stopper includes a body having an outer sidewall and a bottom wall. A seal is releasably connected to the body. The seal has a seal sidewall and a rim extending inwardly from the seal sidewall. The seal sidewall sealingly engages the outer sidewall and the rim sealingly overlaps the bottom wall. The outer sidewall together with the seal define an air pathway for the flow of ambient air into an interior of the vessel.

DETAILED DESCRIPTION

It should, of course, be understood that the description and drawings herein are merely illustrative and that various modifications and changes can be made in the structures disclosed without departing from the present disclosure. For purposes of description herein, spatially relative terms, such as "upper" and "lower" and the like, may be used to describe an element and/or feature's relationship to another element(s) and/or feature(s) as, for example, illustrated in the figures of the present disclosure. Further, any term of degree used herein, such as "substantially", means a reasonable amount of deviation of the modified word is contemplated such that the end result is not significantly changed.

Figure 1:
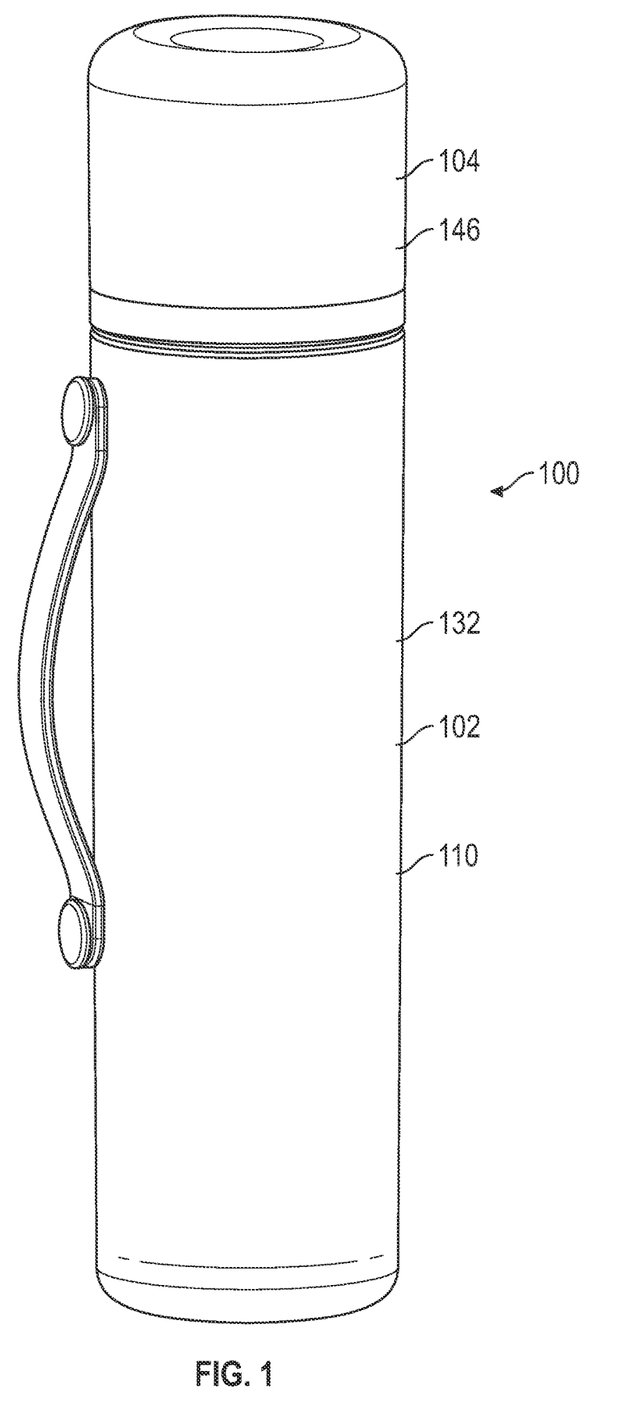
FIG. 1 is a perspective view of a beverage container according to the present disclosure.
Figure 2:
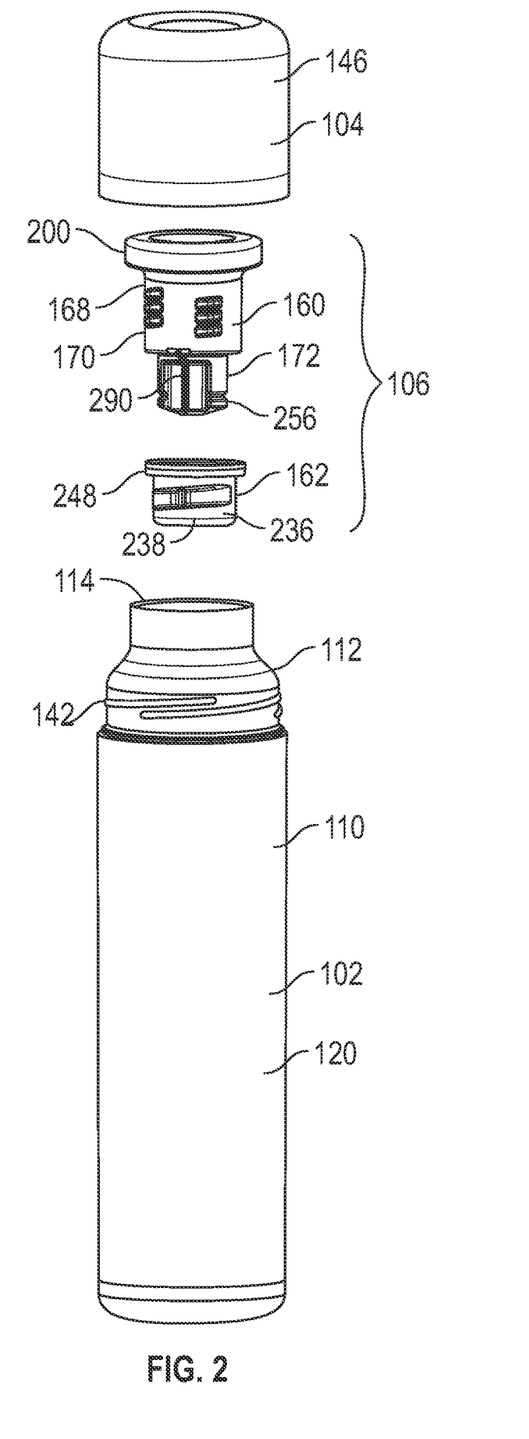
FIG. 2 is a partial exploded perspective view of FIG. 1, depicting the beverage container as generally comprising a vessel, a closure and a stopper.
Figure 3:
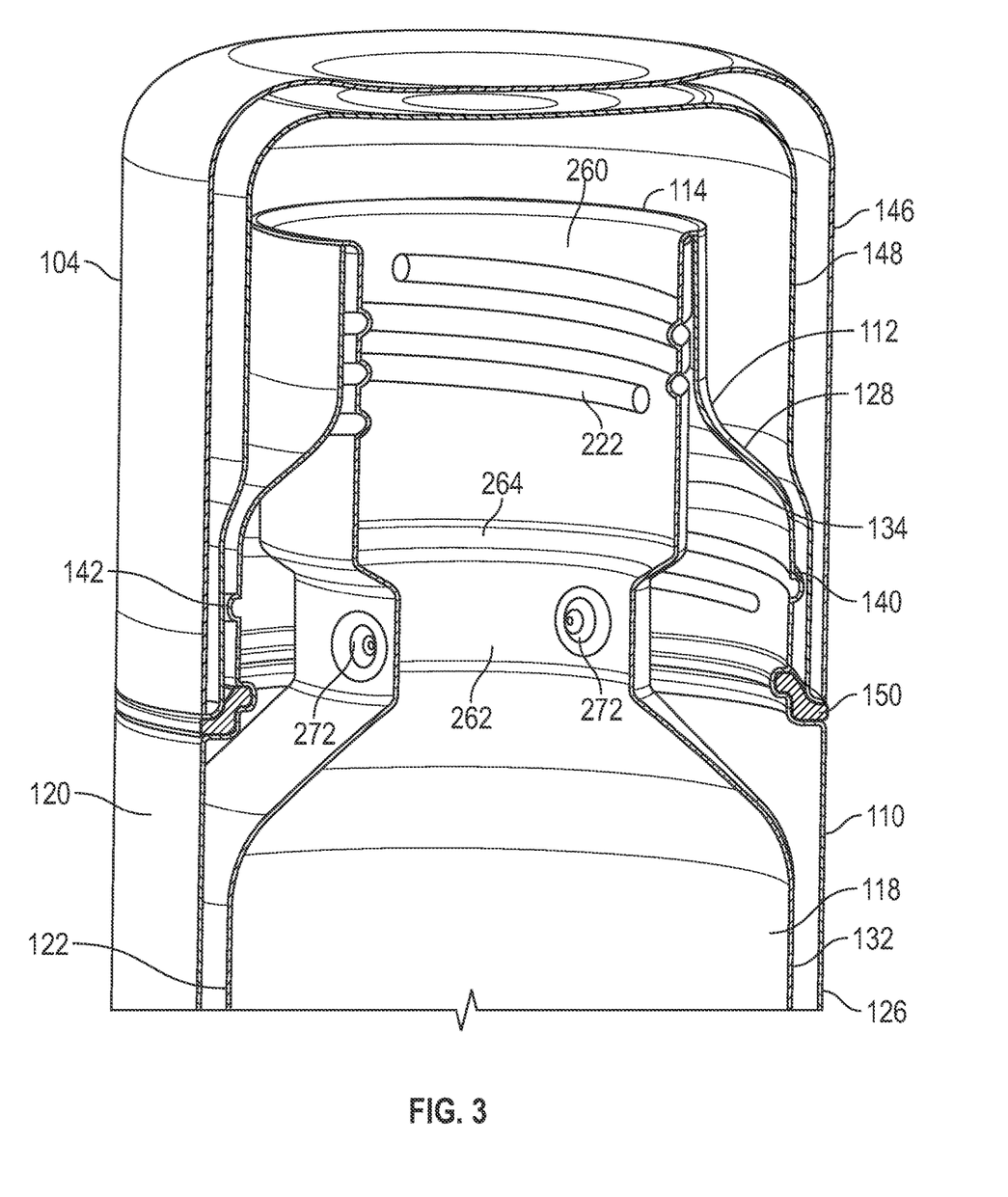
FIG. 3 is a partial cross-sectional perspective view of FIG. 1 without the stopper.

Referring now to the drawings, wherein like numerals refer to like parts throughout the several views, FIG. 1-3 illustrate an exemplary beverage container 100 according to the present disclosure, the beverage container comprising a vessel 102, a closure 104, and a stopper 106 which is complementary to the vessel. The vessel 102 may be configured to retain a desired liquid, and in particular may be configured to retain the desired liquid at a temperature that is either higher or lower than an ambient temperature. The vessel 102 may be fashioned from any material having the desired properties for a beverage container, such as a stainless steel or a plastic formulation (e.g., a thermoplastic, or a thermosetting polymer). In one aspect of the disclosure, the vessel 102 may incorporate a double-walled construction, with the intervening space between vessel walls being substantially evacuated, so that the vessel is a vacuum-insulated vessel 102. In one example, the vessel 102 may be substantially cylindrical in shape as shown; however, it is contemplated that the vessel 102 may be embodied with any shape, as known to one skilled in the art (e.g. with concave and/or convex curvatures, frustoconical, polygonal, non-uniform, etc.), without departing from the scope of the disclosure. The vessel 102 generally includes body 110 having a neck portion 112 with an open end or mouth 114 that provides access to an interior 118 of the vessel 102. With the depicted double-walled construction, the vessel 102 is defined by an outer wall or outer shell 120 and an inner wall or inner shell 122, the outer shell 120 having an outer body portion 126 and an outer neck portion 128, and the inner shell 122 having an inner body portion 132 and an inner neck portion 134. Accordingly, the outer and inner body portions 126, 132 together define the body 110, and the outer and inner neck portions 128, 134 together define the neck portion 112.

The closure 104 (which may alternatively be referred to as a cap or lid) is movable between an attached and a detached configuration with respect to the vessel neck portion 112, and may be configured to function as a cup into which, for example, a portion of the liquid stored in the vessel 102 can be poured. The closure 104 may include one or more suitable securing elements configured so as to provide a sealing closure for the vessel 102. By way of example, the closure 104 may include a first threading 140 that is complementary to a second threading 142 disposed on an outer surface of the neck portion 112 (specifically the outer neck portion 128 of the outer shell 120). That is, the first threading 140 may be configured to mate with the second threading 142, so that the closure 104 may be secured to the neck portion 112. It should be appreciated that additional and/or alternative configurations of securing elements may be used to secure the closure 104 to the vessel 102, for example, a snap-fit or crimped rim. In such cases the closure 104 and neck portion 112 of the vessel 102 need not be circular. In one aspect of the disclosure, the closure 104 may incorporate a double-walled construction, including an outer cup portion 146 and an inner cup portion 148, the first threading 140 provided on an inner surface of the inner cup portion 148. Further, a gasket or seal 150 can be secured by the vessel body 110 at a transition to the neck portion 112 to ensure a sealed connection between the vessel 102 and the closure 104.

Figure 5:
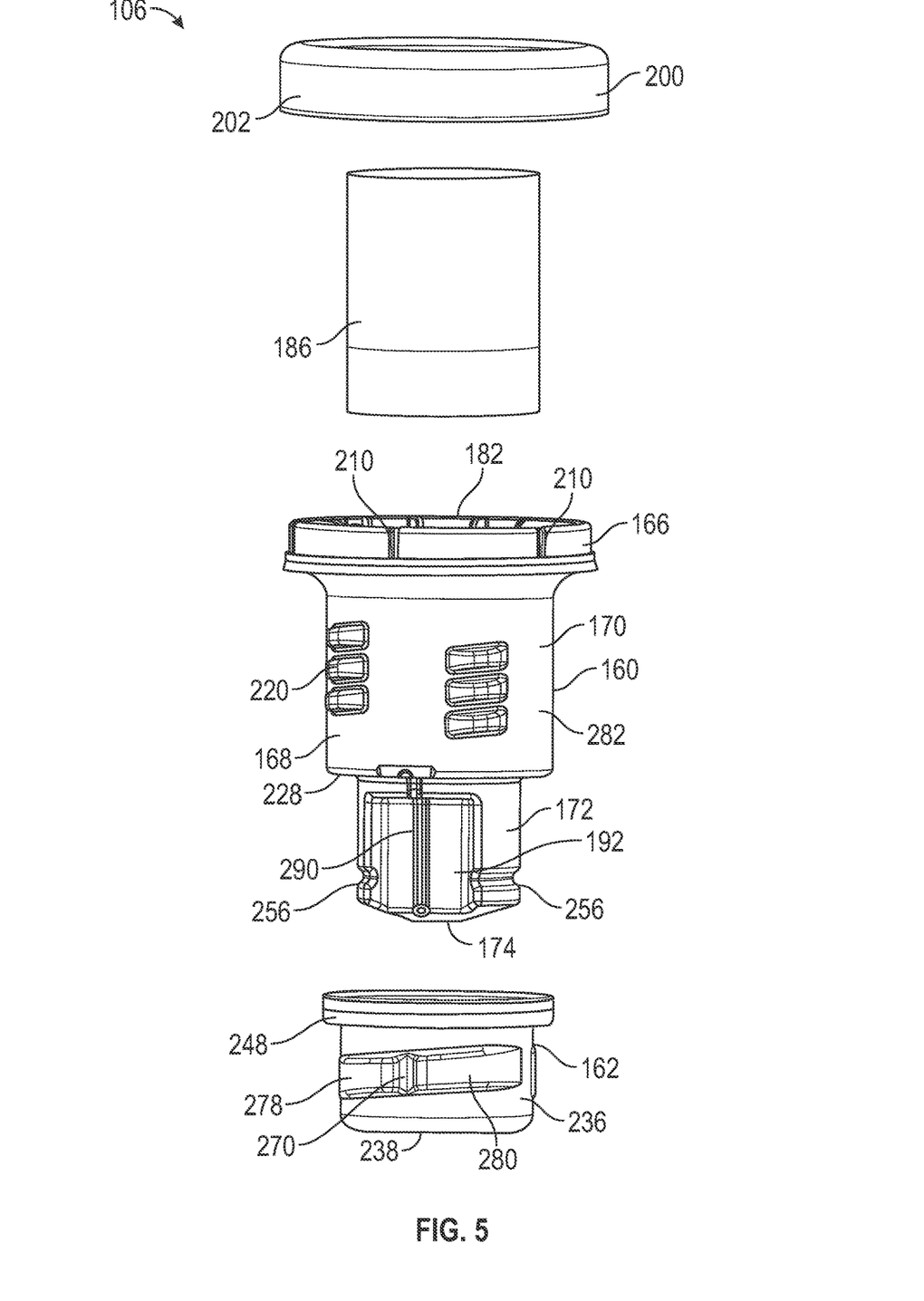
FIG. 5 is an exploded perspective view of the stopper
Figure 6:
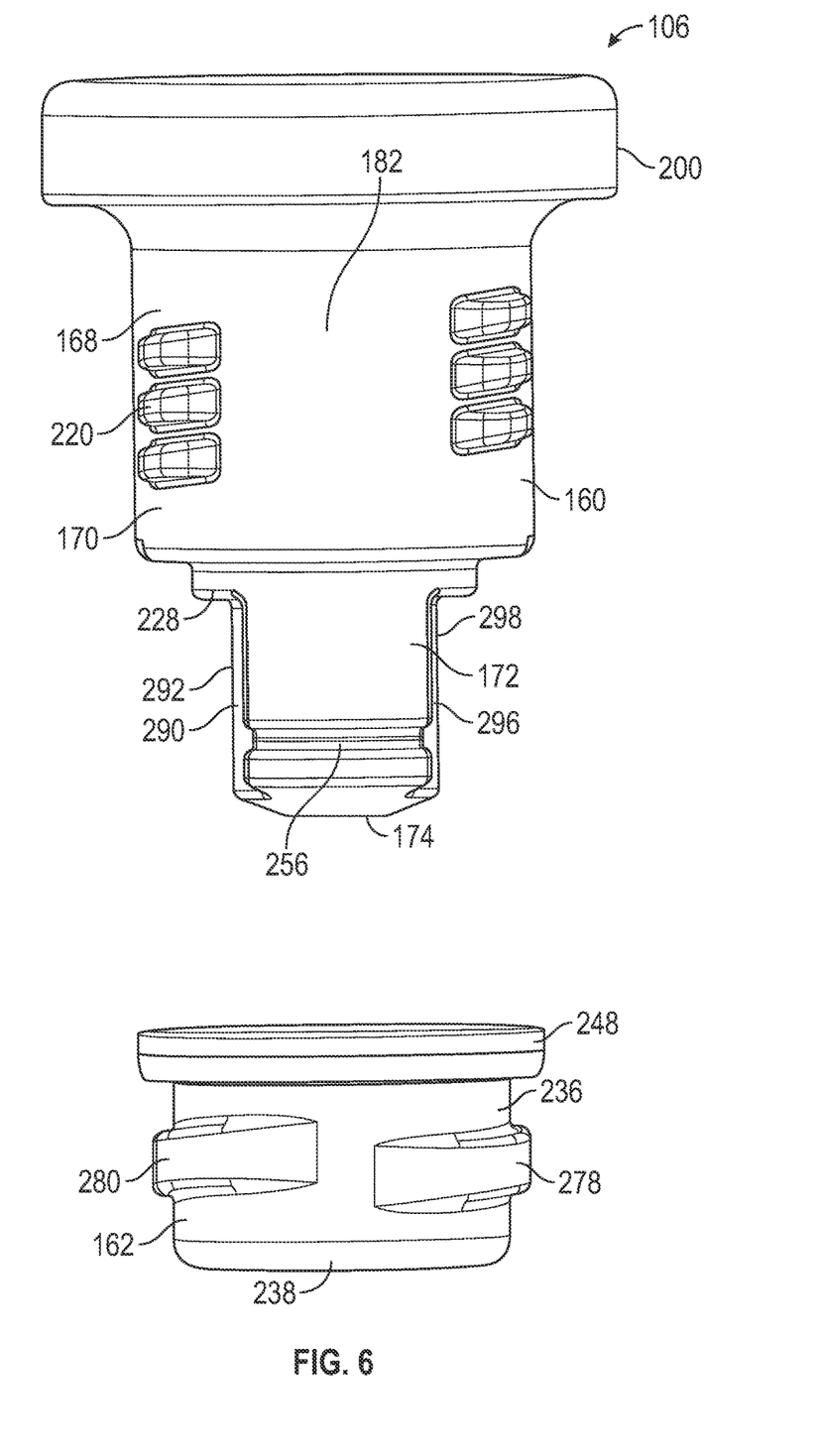
FIG. 6 is a partial exploded perspective view of the stopper.
Figure 7:
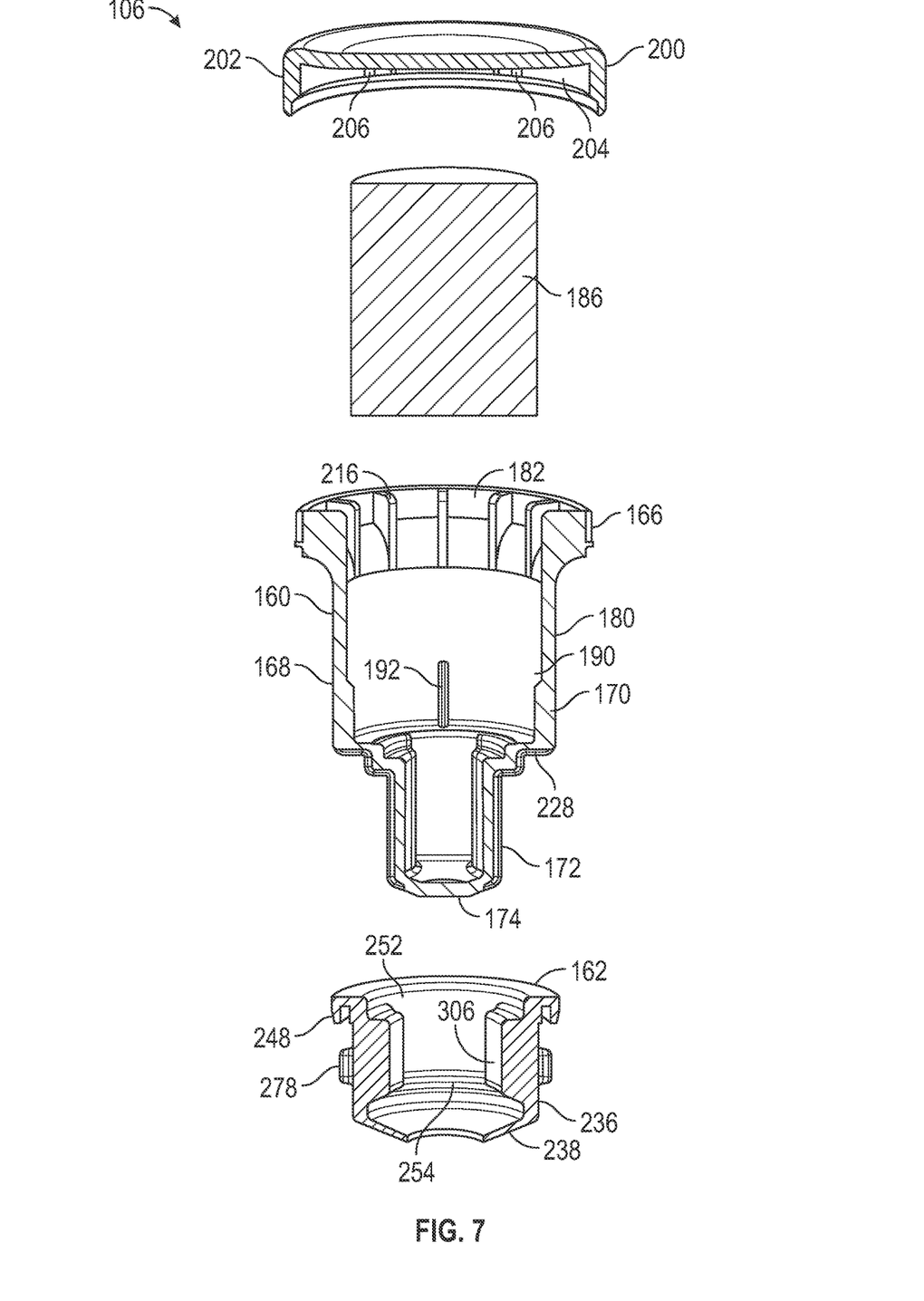
FIG. 7 is an exploded cross-sectional perspective view of the stopper

With reference to FIGS. 4-7, the exemplary stopper 106 includes a body 160 and a seal 162 releasably connected or secured to the body. The body 160 has a top portion 166 and an outer sidewall 168 extended downward from the top portion relative to a longitudinal axis A-A defined by the stopper 106. The top portion 166 is outwardly flared relative to the outer sidewall 168, and the outer sidewall 168 has an upper first portion 170 and a lower second portion 172. Each of the first portion and the second portion can be substantially cylindrical shaped. The second portion 172 is axially spaced from the first portion 170 relative to the longitudinal axis of the stopper 106, with the first portion located between the top portion 166 and the second portion 172. The second portion 172 of the outer sidewall 168 includes a bottom wall 174 of the body 160 of the stopper 106. The bottom wall 174 can have an inverted, substantially dome shape; although, this is not required. In the shown aspect, the body 160 is at least partially hollow defining a cavity 180 with the top portion 166 having the opening 182 to the cavity 180. The cavity 180 is sized to receive therein an insulation member 186, which assists in maintaining a desired temperature of a liquid within the vessel 102. In FIG. 7, an inner surface 190 of stopper can include at least one rib 192 for engaging the insulation member 186 and securing the insulation member within the cavity 180. An upper cap 200 can be fixedly secured to the top portion 166, for example, the upper cap 200 can be overmolded or bonded onto the top portion 166. In the illustrated aspect, the upper cap 200 includes an outer surface 202 and an inner surface 204. The inner surface 204 includes ribs 206 sized for receipt in corresponding slots 210 formed in the top portion. With the upper cap properly connected to the top portion (i.e., the ribs received in the slots), a bonding material 212 fixes the upper cap to the top portion. Further, gussets 216 can be provided on the inner surface 190 at the top portion 166 to provide strength and rigidity to the upper assembled part of the stopper. The outer cap 200 may further include a grippable and/or manipulable surface configured to assist in moving the stopper 106 relative to the vessel.

In the depicted embodiment of the stopper 106, the outer sidewall 168 is adapted for connection to an inner part of the vessel 102, specifically the inner shell or inner wall 122. By way of example, a securing element (i.e., external threads 220) is provided on an outer surface of the first portion 170 for engaging a corresponding securing element (i.e., internal threads 222) provided on the inner neck portion 134 of the inner wall. The second portion 172 of the outer sidewall 168 is radially offset inwardly from the first portion relative to the axis A-A to define an inner wall 228 extended substantially radially from the first portion to the second portion. This configuration of the second portion 172 allows for the mounting of the seal 162 on the body 160 of the stopper.

Figure 8:
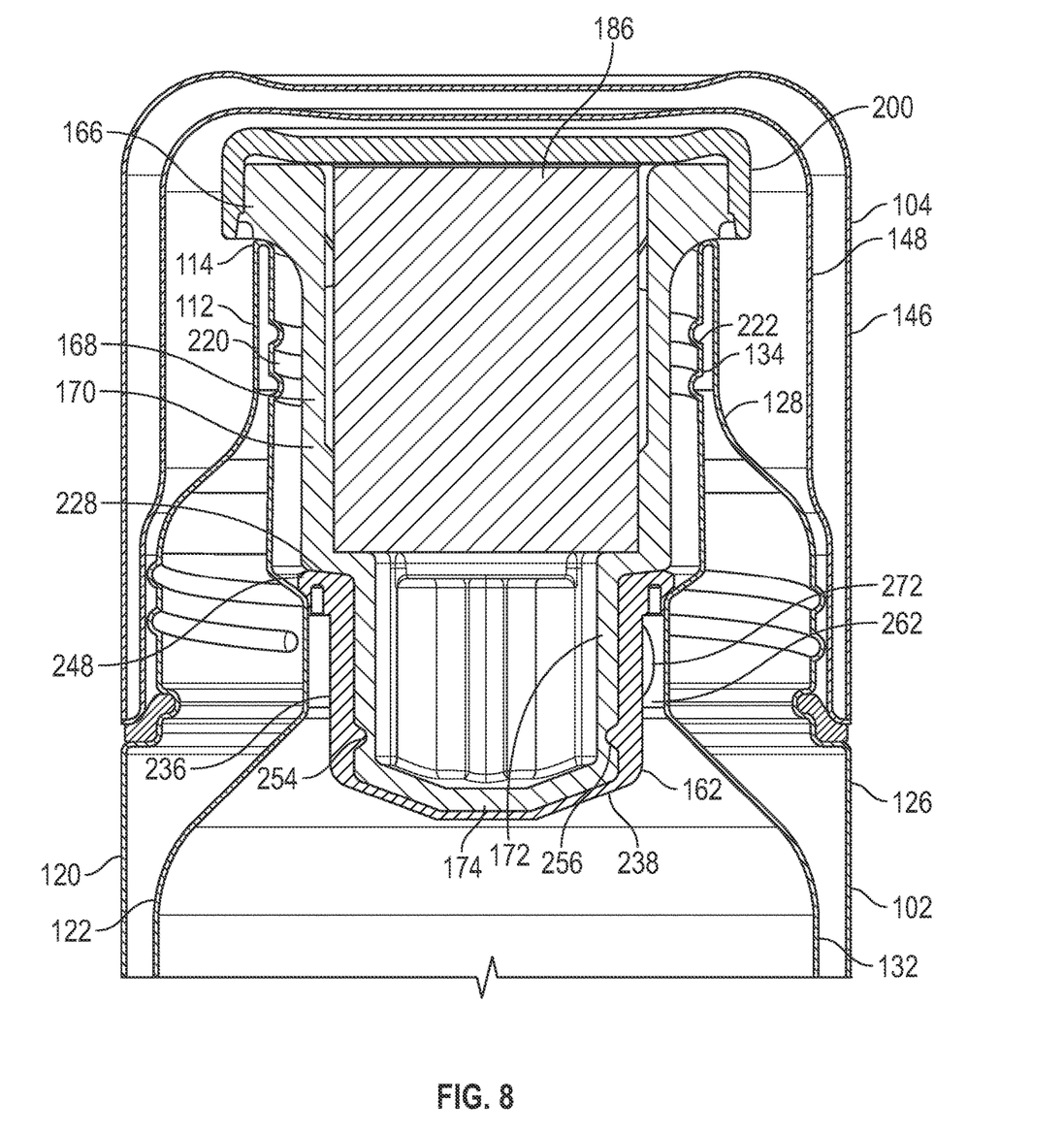
FIGS. 8 and 9 are partial cross-sectional views of FIG. 1 showing the stopper in a closed position.

The seal 162 has a seal sidewall 236 and a rim 238 extending inwardly from the seal sidewall. The seal sidewall 236 has an upper section 240 and a lower section 242 relative to the longitudinal axis A-A, the rim extended from the lower section. When mounted on the second portion 172, the seal sidewall 236 sealingly engages the second portion 172 with the upper section 240 abutting the inner wall 228 and the rim 238 sealingly overlapping the bottom wall 174. As shown, the upper section 240 is provided with a resilient seal lip 248 (that has an inverted U-shape in cross-section, see FIGS. 8 and 9), and the seal lip 248 can be extended both radially and axially from the upper section 240 relative to the axis A-A, with a free end of the seal lip directed downwardly toward the lower section 242. As will be described below, the seal lip 248 sealingly engaging an inner surface of the inner neck portion 134. To securely mount the seal 162 to the second portion 172, an inner surface 252 of the seal sidewall 236 can include at least one retaining bead 254 that is received in at least one correspondingly shaped notch 256 formed in the lower section 242 of the second portion 172. Although, it should be appreciated that alternative ways for securing the seal 162 to the second portion 172 of the stopper outer sidewall 168 are contemplated.

Figure 4:
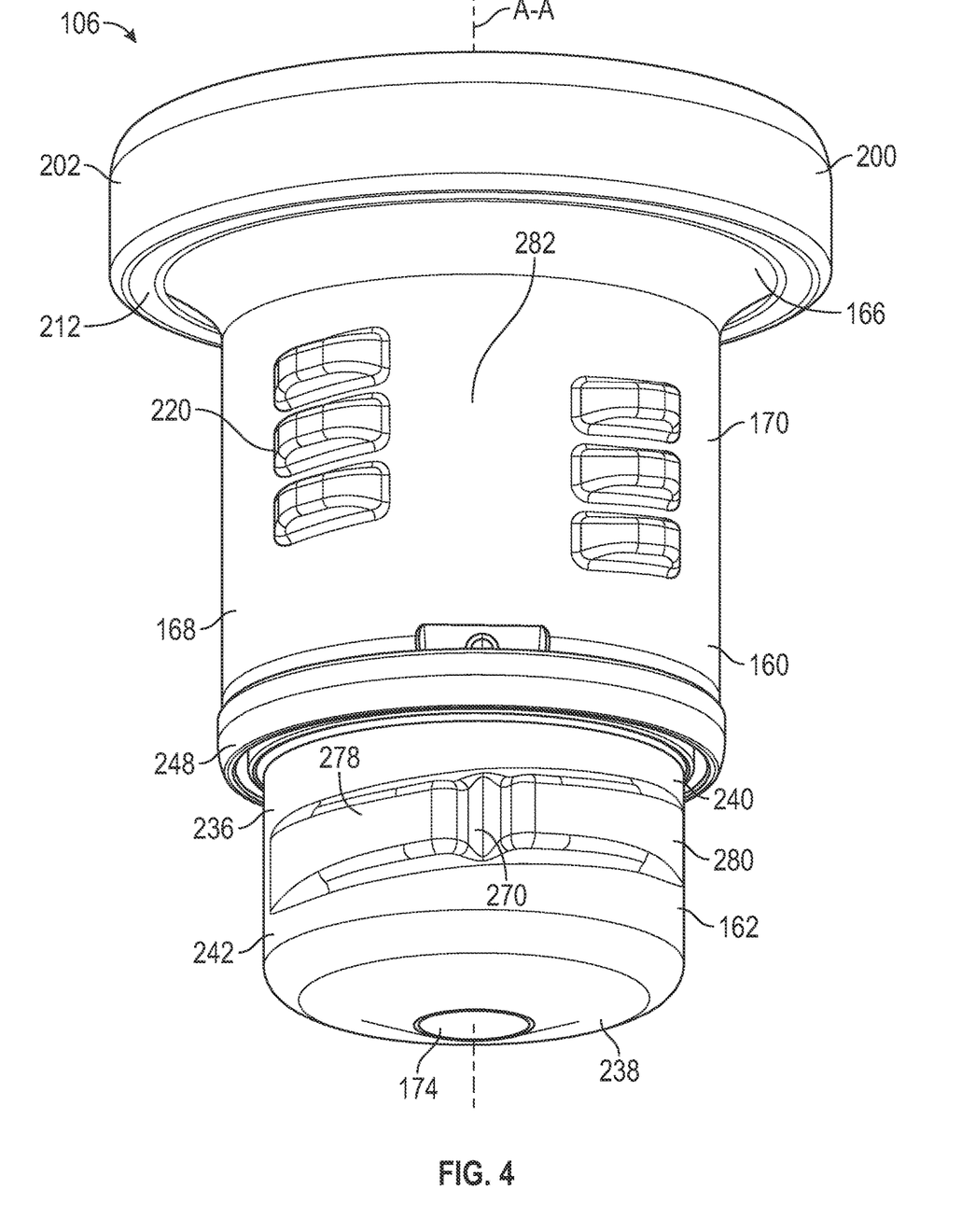
FIG. 4 is a perspective view of the stopper.

The stopper 106 is provided for selective sealing of the open end 114 of the neck portion 112 of the vessel body 110 in a closed, sealed position (FIGS. 8 and 9) and selective unsealing of the open end 114 of the neck portion 112 of the vessel body 110 in an open, drinking/pouring position (FIG. 10), where the stopper 106 is axially spaced from the open end 114. The stopper 106 can be maintained in the open position allowing for pouring of liquid from the vessel. With reference again to FIG. 3, the inner shell 122 includes the inner neck portion 134. The inner neck portion 134 includes an upper section 260 having the threads 222 and a lower section 262. The lower section 262 has a reduced dimension (i.e., diameter) relative to the upper section 260 and can include an outwardly flared portion 264 which transitions into the upper section. In the closed position, the stopper 106 is axially positioned in the neck portion 112 such that the top portion 166 contacts the open end 114 of the vessel 102 and the seal lip 248 is sealingly engaged with the lower section 262 including at the outwardly flared portion 264. In the open position, a first engagement feature on the stopper 106 engages a second engagement feature on the lower section 262, thereby maintaining the stopper in the open position during pouring of liquid from the vessel 102. Specifically, the seal sidewall 236 includes at least one notch 270 (i.e., the first engagement feature) and the lower section includes at least one semi-hemispherical protrusion 272 (i.e., the second engagement feature), and when in the open position the at least one notch 270 receives the at least one protrusion 272 to prevent inadvertent removal of the stopper 106 from the vessel 102 as liquid is being poured from the vessel. It should be appreciated however that this engagement does not prevent the user from completely removing the stopper 106 from the vessel 102. In the depicted aspect, the at least one notch is a pair of notches 270 and the at least one protrusion is a pair of protrusions 272. While two notches and protrusions are shown in the figures, there can be more or less than two notches and protrusions. FIGS. 4 and 5 show the seal sidewall 246 including at least one raised ramped surface 278 with one of the notches 270 located on the at least one ramped surface. More particularly, the seal sidewall 246 has a pair of raised ramp surface 278, 280 abutting the depicted notch 270. The pair of pair of raised ramped surface 278, 280 are asymmetrical in height, with a high ramp surface immediately adjacent the notch 270 and a low ramp surface distal from the notch. The ramped surfaces 278, 280 guide the protrusion 272 into and out of the notch 270, and assist in maintaining the protrusion within the notch in the open position of the stopper 106.

As indicated, the first portion 170 of the outer sidewall 168 of the stopper 106 includes a securing element (i.e., the external threads 220) for connection to the inner part or inner shell 122 of the vessel 102. According to one aspect, the external threads 220 do not extend continuously around the outer surface of the first portion 170 but are interrupted and separated into spaced securing element sections with gaps 282 therebetween. The spacing or gaps 282 between securing element sections define unobstructed liquid flow pathways on the outer sidewall 168 when the stopper 106 is in the open position. Further, the notches 270 on the seal 162 described above for engagement with the protrusions 272 can be axially aligned with two of the gaps 282 in the external threads 220; although, this is not required.

After filling the vessel 102 with a desired liquid, the stopper 106 is rotated in a clockwise direction, lowering the stopper into and engaging the inner neck portion 134 of the inner shell 122. The stopper 106 is in the open position when the protrusions 272 are in the notches 270. To position the stopper 106 in the open position, sufficient force is required to rotate the stopper such that the protrusions 272 can ride over the ramped surfaces 280. Tactile and/or audio feedback can be provided via the protrusions 272 received in the notches 270 to signal the appropriate positioning of the stopper 106 in the open position. To position the stopper in the closed position, the user can continue to rotate the stopper in a clockwise direction. Some force is again required for the protrusions 272 to disengage from the notches 270 and ride over the ramped surfaces 278. Once the protrusion 223 moves down the ramped surfaces 278, the stopper is rotated until the seal lip 248 interacts with the lower section 262 including at the outwardly flared portion 264, compressing the seal lip to create a watertight seal to the open end 114 of the vessel body 110. The reversed steps with the stopper 106 from the closed position to the open position is simply a reversal of the steps from the open position to the closed position described above. When the stopper 106 is secured to in the closed position, the contents of the beverage container 100 are not prone to leaking during routine handling and/or transport. However, the stopper 106 in the closed position does not form a gas tight seal between the stopper and the neck portion 112, so as to allow gas venting and pressure equalization as further described below.

With reference to FIGS. 5 and 6, the stopper 106 is configured to provide an air pathway, such that when a vacuum is formed within the interior 118 of the vessel body 110, ambient air can flow through the air pathway and into the interior of the vessel to equalize interior air pressure of the vessel and ambient air pressure. In the depicted aspect, the outer sidewall 168 of the stopper body 160 together with the seal 162 define the air pathway extending in an axial direction for the flow of ambient air into the interior 118 of the vessel body 110. Particularly, the air pathway is at least partially defined by at least one groove 290 formed in at least one of the outer sidewall 168 and the seal 162. As shown, the at least one groove 290 is formed in the outer sidewall 168, specifically the second portion 172 of the outer sidewall 168, and covered by the seal 162. The at least one groove 290 is further formed in one of the bottom wall 174 and the rim of the seal 162. As shown, the at least one groove 290 is further formed in the bottom wall 174 and covered by the rim 238 of the seal. Further, the at least one groove 290 can be formed on the inner wall 228 extended radially from the first portion 170 to the second portion 172. According to one aspect, the at least one groove can be formed in at least one substantially planar section 292 of the second portion 172; although, this is not required and the at least one groove can be formed in the substantially cylindrical shaped outer surface of the second portion 172. Further to the present disclosure, the at least one groove 290 is a first groove, and the air pathway is at least partially defined by a second groove 296 formed in at least one of the outer sidewall 168 and the seal 162. As shown, the second groove 296 is formed in at least the second portion 172 of the outer sidewall 168 and covered by the seal 162. The second groove 296 is angularly spaced from the first groove 290 relative to the longitudinal axis A-A defined by the stopper 106. Additionally, the at least one substantially planar section 292 is a first planar section, and the second groove 296 can be formed in a second substantially planar section 298 of the second portion 172; although again, this is not required. With the arrangement of the first and second grooves 290, 296, the air pathway includes a first air pathway (defined by sections of the first and second grooves 290, 296 formed on the outer surface of the second portion 172) extending along the axis A-A and a second air pathway (defined by sections of the first and second grooves 290, 296 formed on the inner wall 228) extending axially relative to the axis A-A and intersecting the first air pathway. Further, each of the first and second grooves 290, 296 can be is axially aligned with spacing of gaps 282 between securing element sections of the external threads 220.

Figure 9:
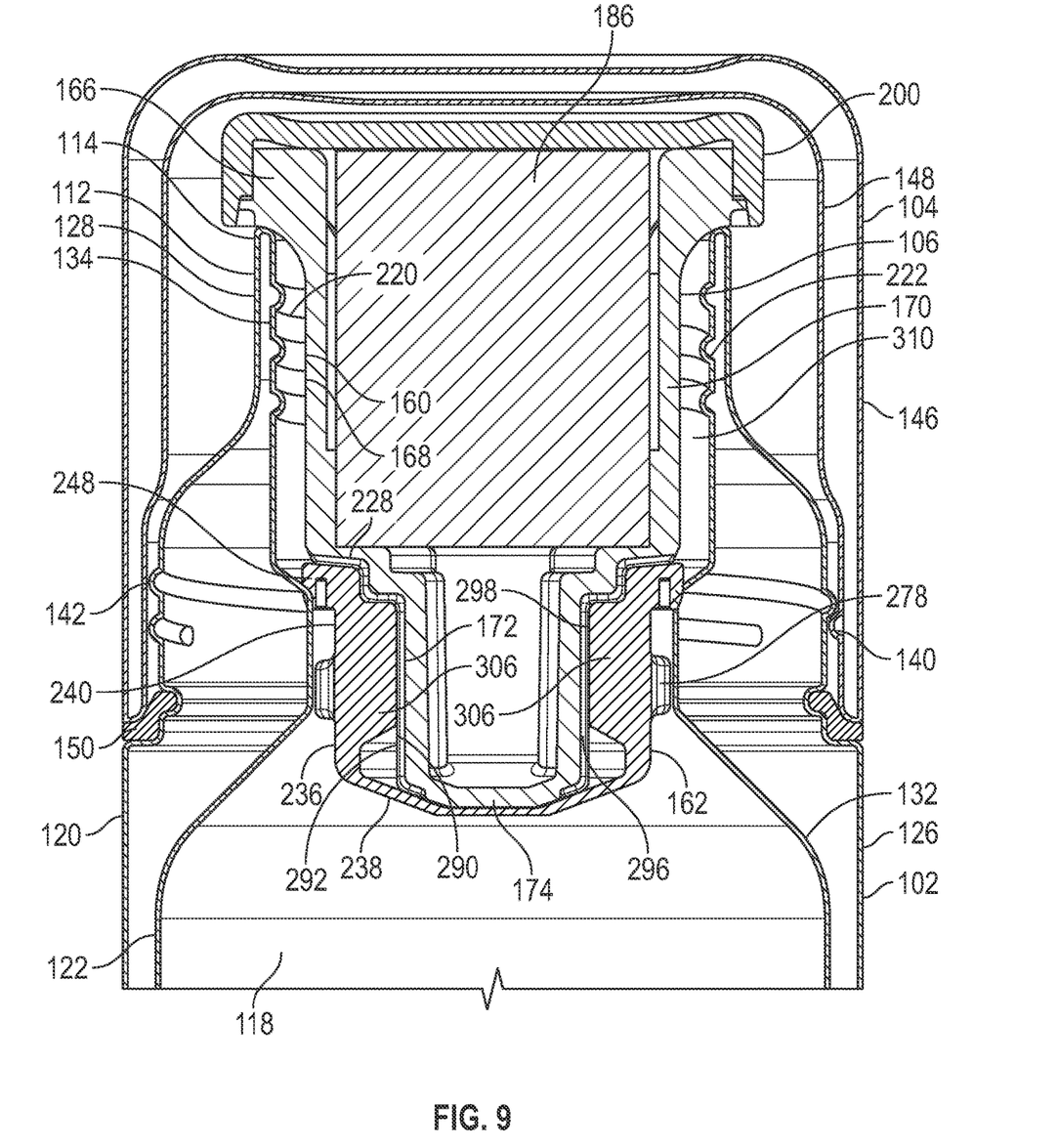
Figure 10:
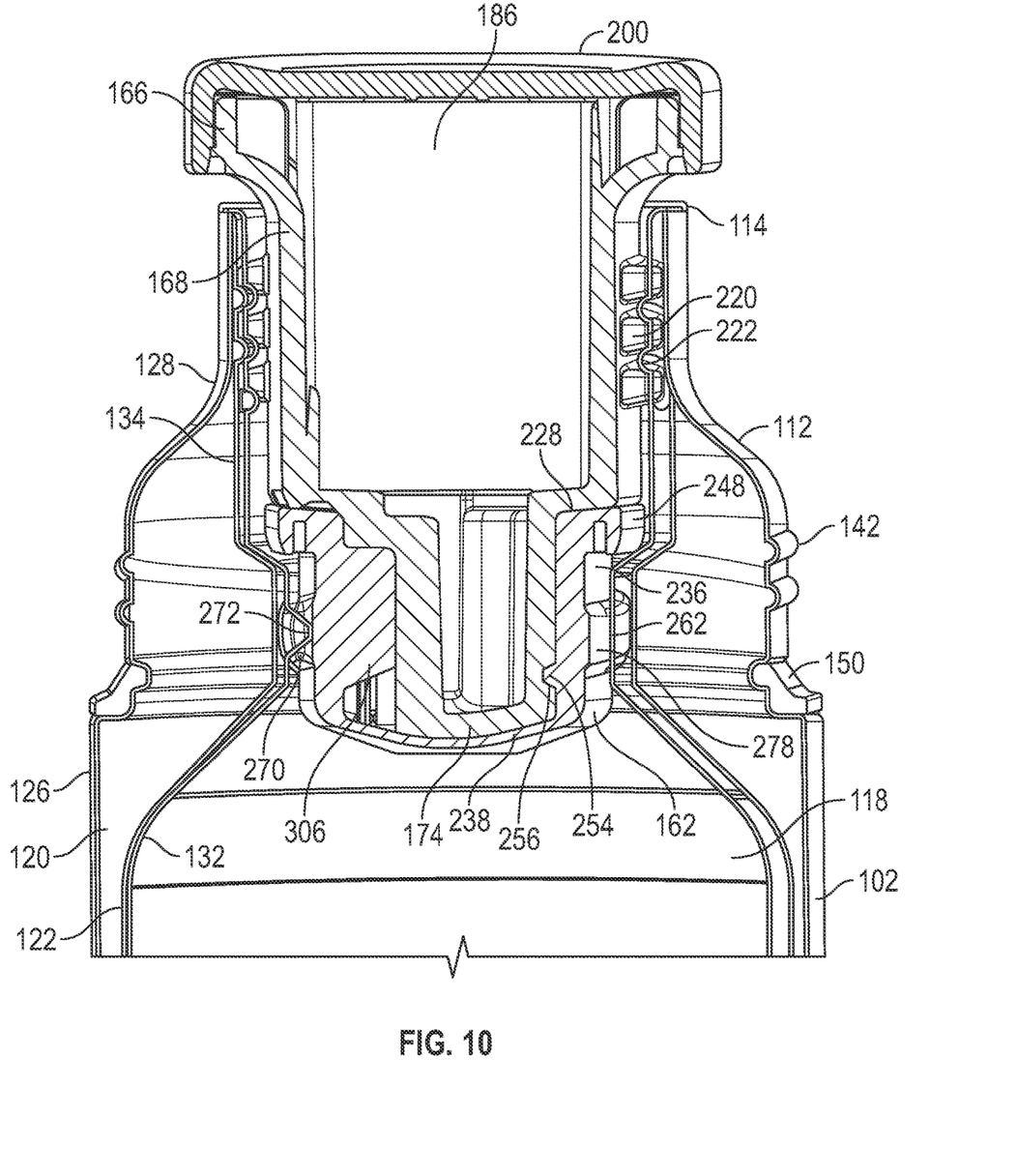
FIG. 10 is a partial cross-sectional view of the vessel and the stopper in an open position.

As described above, the seal 162 is mounted on the second portion 172 with the seal sidewall 236 sealingly engaging the outer surface of the second portion 172 and the rim 238 sealingly overlapping the bottom wall 174. With the arrangement of the first and second grooves 290, 296 in the first and second substantially planar sections 292, 298 formed in the second portion 172, to define the air pathway the seal 162 includes inner shoulders 306 shaped to sealingly engage the first and second substantially planar sections 292, 298 (FIG. 9). When mounted on the second portion 172, the shoulders 306 cover the portions of the first and second grooves 290, 296 extended axially through the first and second substantially planar sections 292, 298. The shoulders 306 together with the upper section 240 of the seal sidewall 236 cover the portions of the first and second grooves 290, 296 extended through the inner wall 228. And the rim 238 covers the portions of the first and second grooves 290, 296 extended through the bottom wall 174.

Figure 11:
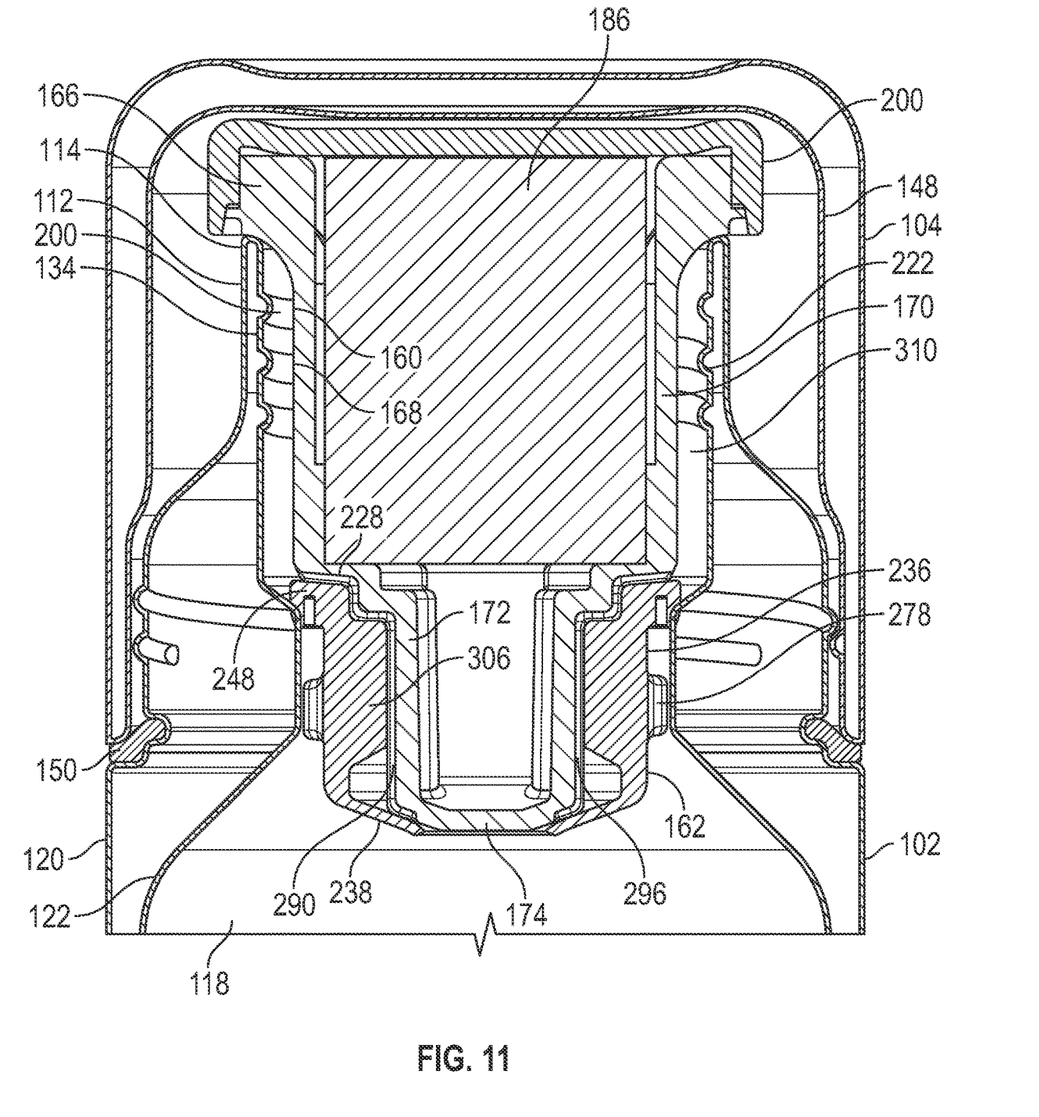
FIG. 11 is a cross-sectional view of FIG. 1 showing a seal of the stopper being partially lifted away from a bottom wall of the stopper allowing ambient air to flow into and through an air pathway defined by the stopper and the seal and into an interior of the vessel.
Figure 12:
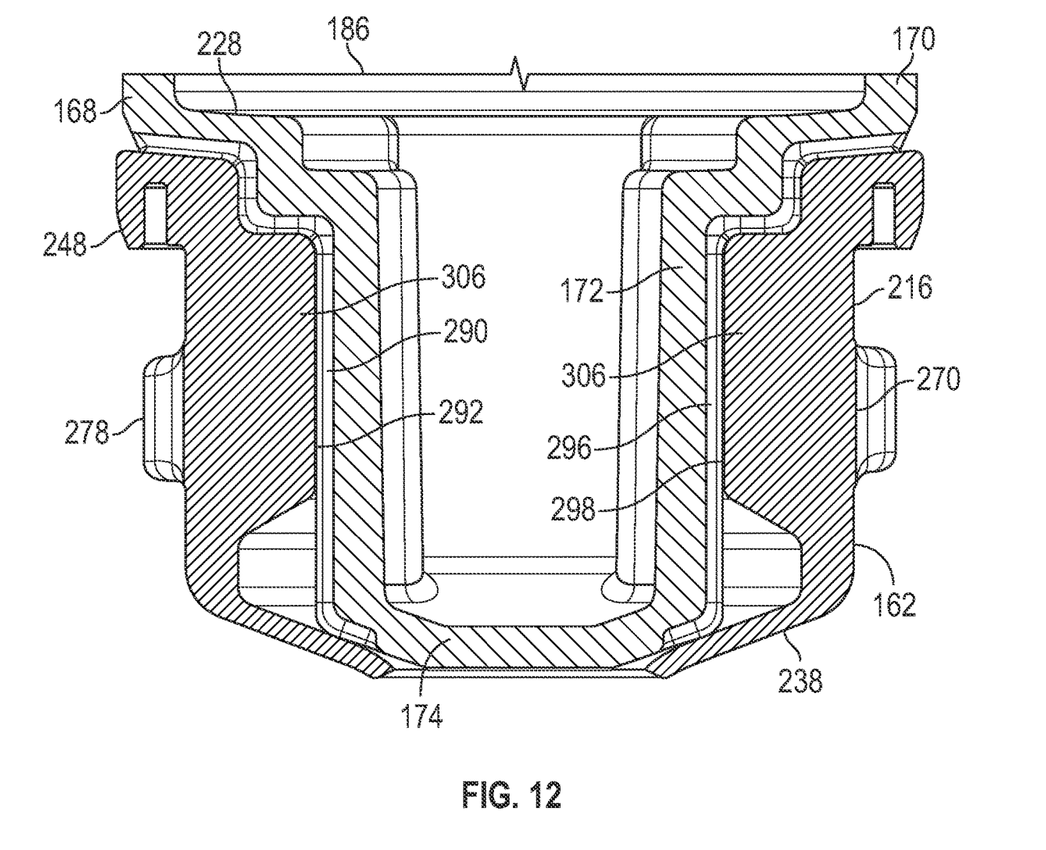
FIG. 12 is a partial enlarged view of FIG. 11.

In FIGS. 11 and 12, when the stopper 106 is in the closed position the rim 238 is configured to be lifted away from the bottom wall 174 when a vacuum is formed within the vessel 102, allowing ambient air to flow through the air pathway (defined by the first and second grooves 290, 296) and into the interior 118 of the vessel to equalize interior air pressure of the vessel and ambient air pressure. In FIG. 9, a lower portion of each shoulder 306 is offset from the rim 238, and this allows for the rim to have a substantially constant overlapping length on the bottom wall 174 of the stopper 106 relative to the longitudinal axis A-A of the stopper depicted in FIG. 4. Therefore, by having the substantially constant length the flexibility and resiliency of the rim 238 is not restricted by the shoulders 306, allowing the rim 238 to be easily lifted from the bottom wall 174 by the vacuum formed in the interior 118. Further, it should be appreciated that an inner dimension of the seal sidewall 236 can be less than an outer dimension of the lower second portion 172 so that when the seal 162 is fitted over the second portion 172 the rim 238 is tensioned and biased against the bottom wall 174 of the stopper body 160. This ensures that air pathway is normally closed or sealed by the rim 238 of the seal 162.

With reference to FIGS. 9, 11 and 12, according to the present disclosure, the top portion 166 of the stopper 106 when in the closed portion is not sealingly engaged to the open end 114 of the neck portion 112 of the vessel 102. Instead, as indicated, in the closed position the seal 162 (specifically the seal lip 248) is sealingly engaged to sealingly engaging the inner surface of the inner neck portion 134. The stopper 106 together with the seal 162 define an air pathway (formed by the first and second grooves 290, 296 covered by the seal 162) in selective fluid communication between a space 310 between the stopper outer sidewall 168 and the inner surface of the inner neck portion 134 and interior 118 of the vessel 102. Due to tolerances between the stopper 106 when in the closed portion and the open end 114 of the neck portion 112, ambient air is capable of flowing between the stopper 106 and the open end 114, into the space 310 and into the air pathway. Therefore, the stopper 106 is provided with the air pathway allowing air flow between the space 310 and the interior 118 of the vessel 102. When the vessel 102 is under pressurized with respect to outside ambient air pressure, a vacuum then formed within the interior 118 lifts that portion of the rim 238 covering the air pathway allowing ambient air to flow through the air pathway and into the vessel. Particularly, ambient air within the space 310 flows between the threaded connection of the stopper 106 and the neck portion 112, into and through the first and second grooves 290, 296, and then into the interior. This allows for equalization of interior air pressure of the vessel 102 and outside ambient air pressure.

It should be appreciated that each of the stopper body 160 and the outer cap 200 can be formed from a plastic, such as a thermoplastic, or a thermosetting polymer. The depicted insulation member 186 is made of a foam material. However, the insulation member 186 may incorporate any suitable material, structure, or device configured to reduce heat transfer between upper and lower surfaces of the insulation member. For example, the insulation member may include one or more plastics that may be the same or different than the plastics used for forming the other components of the stopper 106. In addition to the incorporation of an insulating material, the insulation member 186 may include a plurality of internal voids or apertures configured so that the spaces formed by the voids decrease the thermal transfer due to conduction through the material of the insulation member. The seal 162 may include any material that creates or enhances an air-tight seal between the vessel 102 and the stopper, and in the present embodiment, the seal is made of an elastomeric material (e.g., a food-grade silicone).

It will be appreciated that various of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A stopper for an associated beverage container, comprising:
   a body having a top portion, an outer sidewall extended downward from the top portion relative to a longitudinal axis defined by the stopper, and a bottom wall, the outer sidewall adapted for connection to an inner part of the associated beverage container; and
   a seal releasably connected to the outer sidewall, the seal having a seal sidewall and a rim extending inwardly from the seal sidewall, the seal sidewall sealingly engaging the outer sidewall and the rim sealingly overlapping the bottom wall, wherein the outer sidewall together with the seal define an air pathway extending in an axial direction of the body,
   wherein the outer sidewall includes a first portion and a second portion axially spaced from the first portion relative to the longitudinal axis, the second portion includes the bottom wall of the body, the seal mounted on the second portion.

2. The stopper of claim 1, wherein the air pathway is at least partially defined by at least one groove formed in at least one of the outer sidewall and the seal sidewall.

3. The stopper of claim 2, where the at least one groove is further formed in at least one of the bottom wall and the rim of the seal.

4. The stopper of claim 2, wherein the second portion of the outer sidewall is radially offset inwardly from the first portion relative to the longitudinal axis to define an inner wall extended radially from the first portion to the second portion, and the at least one groove is further formed on the inner wall.

5. The stopper of claim 2, wherein the at least one groove is a first groove, and the air pathway is at least partially defined by a second groove formed in at least one of the outer sidewall and the seal sidewall, the second groove angularly spaced from the first groove relative to the longitudinal axis.

6. The stopper of claim 2, wherein the outer sidewall includes a substantially planar section, and the at least one groove is formed in the substantially planar section.

7. The stopper of claim 2, wherein the outer sidewall includes a securing element for connection to the inner part of the associated beverage container, the securing element is separated into spaced securing element sections, a spacing between securing element sections defines a liquid flow pathway on the outer sidewall.

8. The stopper of claim 7, wherein the at least one groove is axially aligned with spacing between securing element sections.

9. The stopper of claim 2, in combination with the beverage container, the beverage container including a vessel having a vessel body with a neck portion, the neck portion defining an open end of the vessel, the body having an outer wall and an inner wall,
   the stopper for selective sealing of the open end of the vessel body in a closed, sealed position and selective unsealing of the open end of the vessel body in an open position, when in the open position the seal of the stopper is engaged with at least one protrusion extending from the inner wall to prevent removal of the stopper from the vessel.

10. The combination of claim 9, wherein the seal sidewall includes at least one notch for receiving the at least one protrusion when in the open position of the stopper.

11. The combination of claim 10, wherein the seal sidewall includes at least one raised ramped surface with the at least one notch located on the at least one ramped surface.

12. The combination of claim 9, when the stopper is in the closed position the rim is configured to be lifted away from the bottom wall of the stopper when an interior air pressure of the vessel is less than ambient air pressure, allowing ambient air to flow through the air pathway and into an interior of the vessel to equalize interior air pressure of the vessel and ambient air pressure.

13. A beverage container, comprising:
a vessel including a vessel body with a neck portion, the body having an outer wall and an inner wall, the neck portion defining an open end of the vessel body; and
a stopper for selective sealing of the open end of the vessel body in a closed, sealed position and selective unsealing of the open end of the vessel body in an open position,
wherein the stopper includes:
a body having an outer sidewall and a bottom wall, and
a seal releasably connected to the body, the seal having a seal sidewall and a rim extending inwardly from the seal sidewall, the seal sidewall sealingly engaging the outer sidewall and the rim sealingly overlapping the bottom wall, wherein the outer sidewall together with the seal define an air pathway for flow of ambient air into an interior of the vessel,
wherein the seal sealingly engages an inner surface of the inner wall when the stopper is in the closed position.

14. The beverage container of claim 13, when the stopper is in the closed position the rim is configured to be lifted away from the bottom wall when a vacuum is formed within the interior of the vessel, allowing ambient air to flow through the air pathway and into the interior of the vessel to equalize interior air pressure of the vessel and ambient air pressure.

15. The beverage container of claim 13, wherein the air pathway is at least partially defined by at least one groove formed in the body and covered by the seal.

16. The beverage container of claim 13, wherein at least one protrusion extends from the inner wall of the vessel, and when in the open position of the stopper the seal is engaged with at least one protrusion to prevent removal of the stopper from the vessel.

17. The beverage container of claim 16, wherein the seal sidewall includes at least one notch for receiving the at least one protrusion when in the open position of the stopper.

18. The beverage container of claim 13, wherein the stopper defines a longitudinal axis, and the air pathway includes a first air pathway extending along the longitudinal axis and a second air pathway extending axially relative to the longitudinal axis and intersecting the first air pathway.

* * * * *